April 30, 1929.  R. BRANDT  1,711,012
COMBINATION DRILL AND COUNTERSINK
Filed March 30, 1925
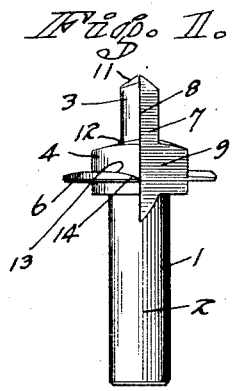
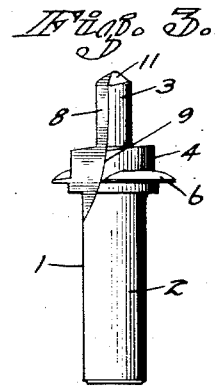
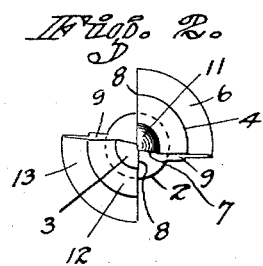
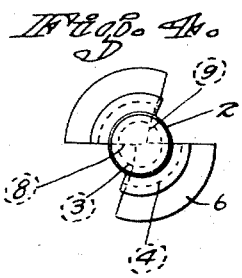
Inventor
RUDOLPH BRANDT
By
Attorneys Patented Apr. 30, 1929.

UNITED STATES PATENT OFFICE.

RUDOLPH BRANDT, OF SAN FRANCISCO, CALIFORNIA, ASSIGNOR TO PETRY & BRANDT, OF SAN FRANCISCO, CALIFORNIA, A COPARTNERSHIP.

COMBINATION DRILL AND COUNTERSINK.

Application filed March 30, 1925. Serial No. 19,331.

The present invention relates to improvements in a combination drill and countersink. The drill to be described in the present application is intended to be used in connection with the drilling of brake linings and its principal features are the incorporation of a drilling portion, a counter-sinking portion and a stop into one single-piece unit and to arrange the three portions in such a manner that the whole unit may be manufactured very economically.

Further objects and advantages of my device will appear as the specification proceeds.

The preferred form of my invention is illustrated in the accompanying drawing, in which Figure 1 shows a side view of my combination drill and countersink.

Figure 2 a top plan view of the same.

Figure 3 a side view taken at right angles to that of Figure 1, and

Figure 4 a bottom plan view.

While I have shown only the preferred form of the invention, it should be understood that various changes or modifications may be made within the scope of the claim hereto attached without departing from the spirit of the invention.

In its preferred form my drill 1 comprises a shank 2 adapted to be mounted in any suitable manner in a chuck, not shown in the drawing, having a reduced end portion 3 at one end thereof with an enlargement 4 adjacent the said end portion and a second enlargement 6 forming a continuation of the first enlargement 4. A peripheral cut 7 is milled into the material so as to extend from the point of the reduced end through the two enlargements into that portion of the shank 2 below the enlargements, the said cut being formed to present one straight side 8 lying in a radial plane of the shank and one curved side 9 penetrating into the material rather deeply near the point of the drill and gradually decreasing in depth as it passes through the enlargements. The two enlargements 8 and 9 form an angle somewhat less than 90°.

The end face 11 of the reduced portion 3 of the shank is pointed and formed to rise toward the straight side 8 of the cut so as to produce a cutting edge adjacent the cut. A corresponding end face 12 of the first enlargement is also formed to rise toward the straight side 8 of the cut so as to form a corresponding cutting edge, but the corresponding face 13 of the second enlargement is made to drop toward the straight side 8 of the cut as shown at 14 so that no cutting edge is presented at this point, the form of the second enlargement rather tending to cause the same to slide over the material when the drill is revolved and to ascend any slight wave that may be thrown up in the flexible material ahead of the same due to the drilling action. In actual use when the drill is rotated, the reduced end drills into the material of the brake band by means of its cutting edge and after the reduced end has reached a depth sufficient to allow the first enlargement to come in contact with the material, the said enlargement drills into the same and forms a larger hole to the depth of its penetration. When the material, due to the continuation of the process, is engaged by the second enlargement 6, no cutting edge is presented to the material and the slight curve at 14 causes the second enlargement to slide over the material and to thus form an effective stop to further penetration.

It is evident, of course, that instead of one cut two cuts may be provided, as shown in Figures 2 and 4.

It will be seen that this single-piece drill and countersink is comparatively easy to manufacture, it only being necessary to stepwise reduce a shank of the original size of the second enlargement to the shape illustrated in the drawing, to then mill the cuts into the shank and to file the working faces into the respective forms previously described.

I claim:

A tool comprising a drilling portion, a counter-sinking portion, a stop for limiting the depth to which the drilling and countersinking portions enter the material, said tool having a groove extending longitudinally from the tip of the drilling portion through the stop, one side of said groove being flat for providing a cutting edge in the drilling portion and the countersinking portion, the other side of said groove being curved and emerging from the tool at a point beyond the stop, said groove performing the double function of conveying the cut material away from the tool and of providing a cutting edge for the drilling portion and the countersinking portion.

RUDOLPH BRANDT.